(12) United States Patent
Armstrong et al.

(10) Patent No.: US 7,331,608 B2
(45) Date of Patent: Feb. 19, 2008

(54) ELECTRICALLY ACTUATED STEERING COLUMN MECHANISM

(75) Inventors: Ray G. Armstrong, Bay City, MI (US); Richard K. Riefe, Saginaw, MI (US); Ravindra Jwalapathy, Saginaw, MI (US); Marvin V. Manwaring, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 425 days.

(21) Appl. No.: 10/882,585

(22) Filed: Jul. 1, 2004

(65) Prior Publication Data

US 2004/0239089 A1 Dec. 2, 2004

Related U.S. Application Data

(63) Continuation-in-part of application No. 10/184,695, filed on Jun. 27, 2002, now Pat. No. 7,055,860.

(51) Int. Cl.
*B62D 1/18* (2006.01)
(52) U.S. Cl. .................. 280/775; 280/777; 74/493; 74/495
(58) Field of Classification Search .............. 280/775, 280/777; 74/493, 495, 527; 70/183–187, 70/245, 252, 247, 248
See application file for complete search history.

(56) References Cited

U.S. PATENT DOCUMENTS

| 3,978,740 | A |   | 9/1976 | Selzer |   |
|---|---|---|---|---|---|
| 4,244,236 | A |   | 1/1981 | Sylvester |   |
| 4,449,419 | A |   | 5/1984 | Soler Bruguera |   |
| 4,656,888 | A |   | 4/1987 | Schmitz |   |
| 4,752,085 | A |   | 6/1988 | Yamamoto | ............... 280/775 |
| 4,967,618 | A | * | 11/1990 | Matsumoto et al. | .......... 74/493 |
| 5,029,489 | A |   | 7/1991 | Burmeister et al. |   |
| 5,035,446 | A |   | 7/1991 | Arvidsson |   |
| 5,070,741 | A | * | 12/1991 | Ervin | ........................ 74/492 |
| 5,163,337 | A | * | 11/1992 | Herron et al. | ............... 74/493 |
| 5,259,264 | A |   | 11/1993 | Bodin et al. |   |
| 5,419,215 | A | * | 5/1995 | Herron et al. | ............... 74/493 |

(Continued)

FOREIGN PATENT DOCUMENTS

DE 10240267 11/2003

(Continued)

*Primary Examiner*—Paul N. Dickson
*Assistant Examiner*—Toan C. To
(74) *Attorney, Agent, or Firm*—Michael D. Smith

(57) ABSTRACT

An apparatus for positioning a steering wheel of a vehicle in a desired position. The invention includes a steering column having a steering wheel supporting portion for supporting the steering wheel. The steering column also includes first and second members movable relative to one another. The first and second members are moved relative to one another to move the steering wheel supporting portion, and the steering wheel, along either tilting path of movement, or a telescoping path of movement, or both. The invention also includes a locking device that selectively engages the first and second members to lock the first and second members with respect to one another. The locking device substantially prevents movement of the steering wheel supporting portion, and the steering wheel, along the path of movement. The locking device includes an electric motor. The first and second members are locked and unlocked with respect to one another in response to activation of the electric motor.

14 Claims, 12 Drawing Sheets

U.S. PATENT DOCUMENTS

| | | | |
|---|---|---|---|
| 5,449,199 A | 9/1995 | Heinrichs et al. | |
| 5,477,744 A * | 12/1995 | Hoblingre et al. | 74/493 |
| 5,485,376 A | 1/1996 | Oike et al. | 364/424.05 |
| 5,520,416 A | 5/1996 | Singer et al. | 280/775 |
| 5,524,927 A | 6/1996 | Toussaint | |
| 5,562,306 A | 10/1996 | Rispeter | 280/775 |
| 5,606,891 A | 3/1997 | Tisell et al. | |
| 5,685,180 A * | 11/1997 | Qualters et al. | 70/188 |
| 5,722,299 A | 3/1998 | Yamamoto et al. | |
| 5,787,759 A | 8/1998 | Olgren | |
| 5,820,163 A * | 10/1998 | Thacker et al. | 280/775 |
| 5,829,311 A | 11/1998 | Roberson | 74/493 |
| 6,019,391 A * | 2/2000 | Stuedemann et al. | 280/779 |
| 6,068,295 A | 5/2000 | Skabrond et al. | |
| 6,139,057 A | 10/2000 | Olgren et al. | |
| 6,189,405 B1 | 2/2001 | Yazane | 74/493 |
| 6,237,438 B1 | 5/2001 | Ben Rhouma al. | 74/492 |
| 6,290,258 B1 * | 9/2001 | Parkinson et al. | 280/775 |
| 6,390,505 B1 * | 5/2002 | Wilson | 280/775 |
| 6,419,269 B1 | 7/2002 | Manwaring et al. | 280/775 |
| 6,616,185 B2 | 9/2003 | Manwaring et al. | 280/775 |
| 6,659,504 B2 | 12/2003 | Riefe et al. | |
| 6,666,478 B2 | 12/2003 | Livengod | |
| 6,695,349 B2 | 2/2004 | Bohlen et al. | |
| 6,748,774 B2 | 6/2004 | Dubay et al. | |
| 6,761,376 B2 | 7/2004 | Riefe et al. | |
| 7,159,904 B2 * | 1/2007 | Schafer et al. | 280/775 |
| 2002/0024208 A1 | 2/2002 | Fujiu et al. | |
| 2003/0103805 A1 | 6/2003 | Braun et al. | |
| 2004/0150207 A1 * | 8/2004 | Satou | 280/777 |
| 2005/0097978 A1 | 5/2005 | Ben Rhouma et al. | |

FOREIGN PATENT DOCUMENTS

| | | |
|---|---|---|
| EP | 03272528 | 4/1991 |
| EP | 1375296 | 2/2004 |
| EP | 1531111 | 5/2005 |
| FR | 2687628 | 8/1993 |
| GB | 2327257 | 1/1999 |

* cited by examiner

ELECTRICALLY ACTUATED STEERING COLUMN MECHANISM

CROSS REFERENCE TO RELATED APPLICATIONS

This application is a continuation-in-part of U.S. application Ser. No. 10/184,695 for an ELECTRICALLY ACTUATED STEERING COLUMN MECHANISM, filed Jun. 27, 2002 now U.S. Pat No. 7,055,860.

TECHNICAL FIELD

This invention relates to an adjustable steering column and more particularly to an adjustable steering column for positioning a steering wheel in a vehicle and a locking device for fixing the position of the steering wheel after adjustment.

BACKGROUND OF THE INVENTION

Adjustable steering columns include first and second members that are moveable relative to one another. These first and second members can take the form of inner and outer steering column jackets, lower and upper steering column jackets, a tilt housing in combination with non-tilting member, or brackets. A steering wheel is positioned at the end of the steering column and the driver can move the first and second members relative to one another to position the steering wheel as desired. Adjustable steering columns also include a locking mechanism to lock the first and second members relative to one another to prevent the steering wheel from moving from the desired position. Locking mechanisms include a lever placed on the steering column. The lever is placed on the side or on the underside of the steering column and can be cumbersome to adjust. Another ergonomic drawback of levers is associated with right-hand drivers versus left-hand drivers; placement of the lever to accommodate the former will be less than optimal for the latter and vice-versa.

SUMMARY OF THE INVENTION

The present invention provides an apparatus for positioning a steering wheel of a vehicle in a desired position. The invention includes a steering column having a steering wheel supporting portion for supporting the steering wheel. The steering column also includes first and second members movable relative to one another. The first and second members are moved relative to one another to move the steering wheel supporting portion, and the steering wheel, along either tilting path of movement, or a telescoping path of movement, or both. The invention also includes a locking device that selectively engages the first and second members to lock the first and second members with respect to one another. The locking device substantially prevents movement of the steering wheel supporting portion, and the steering wheel, along the path of movement. The locking device includes an electric motor. The first and second members are locked and unlocked with respect to one another in response to activation of the electric motor.

BRIEF DESCRIPTION OF THE DRAWINGS

These and other features and advantages of the present invention will become more readily appreciated when considered in connection with the following detailed description and appended drawings, where.

DETAILED DESCRIPTION OF THE PREFERRED EMBODIMENTS

Figure 1:
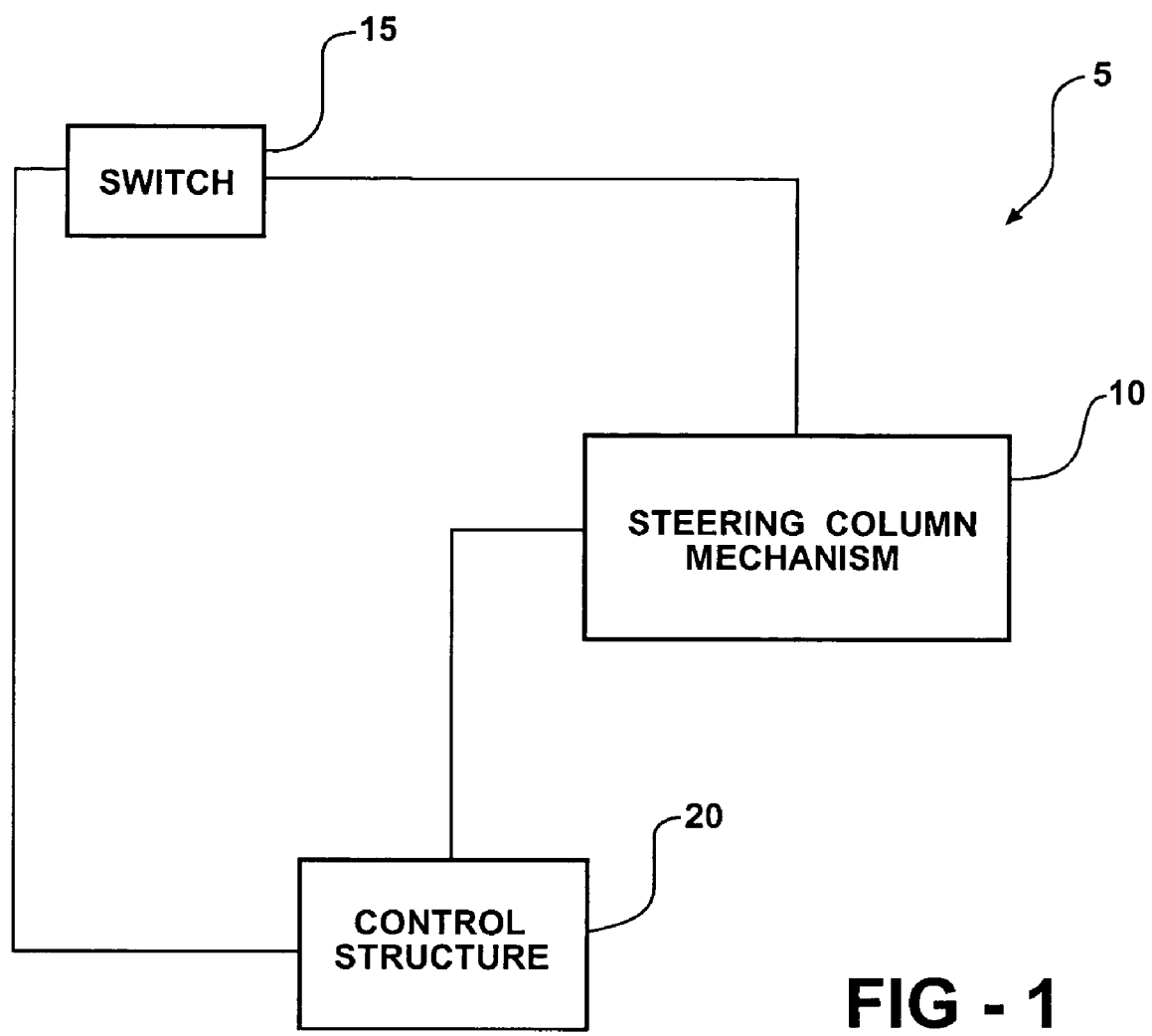
FIG. 1 is a schematic diagram of an electrically actuated steering column system according to a first exemplary embodiment of the invention.

FIG. 1 schematically shows an electrically actuated steering column system 5 according to a first exemplary embodiment of the invention. The electrically actuated steering column system 5 includes a steering column 10, a switch 15, and a control structure 20. The steering column 10 is adjustable to position a steering wheel in a vehicle and the control structure 20 prevents adjusting movement of the steering column 10 after the steering wheel has been positioned in a desired position. The switch 15 is spaced from the steering column 10 and selectively activates or deactivates the control structure 20 to allow or prevent, respectively, movement of the steering column 10. The switch 15 can be disposed at any one of a plurality of different locations in the vehicle.

Figure 2:
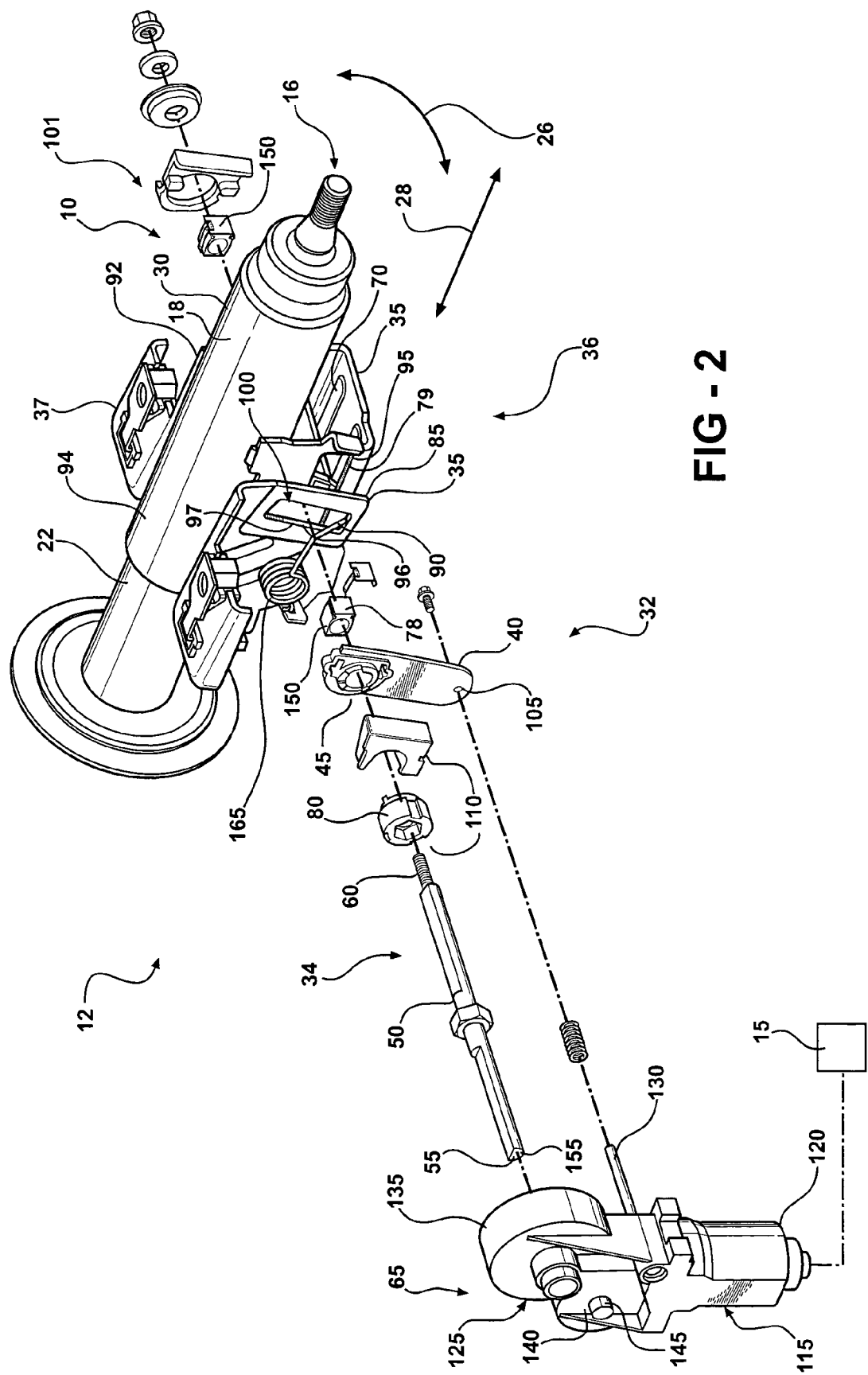
FIG. 2 is an exploded view of the first exemplary embodiment.
Figure 3:
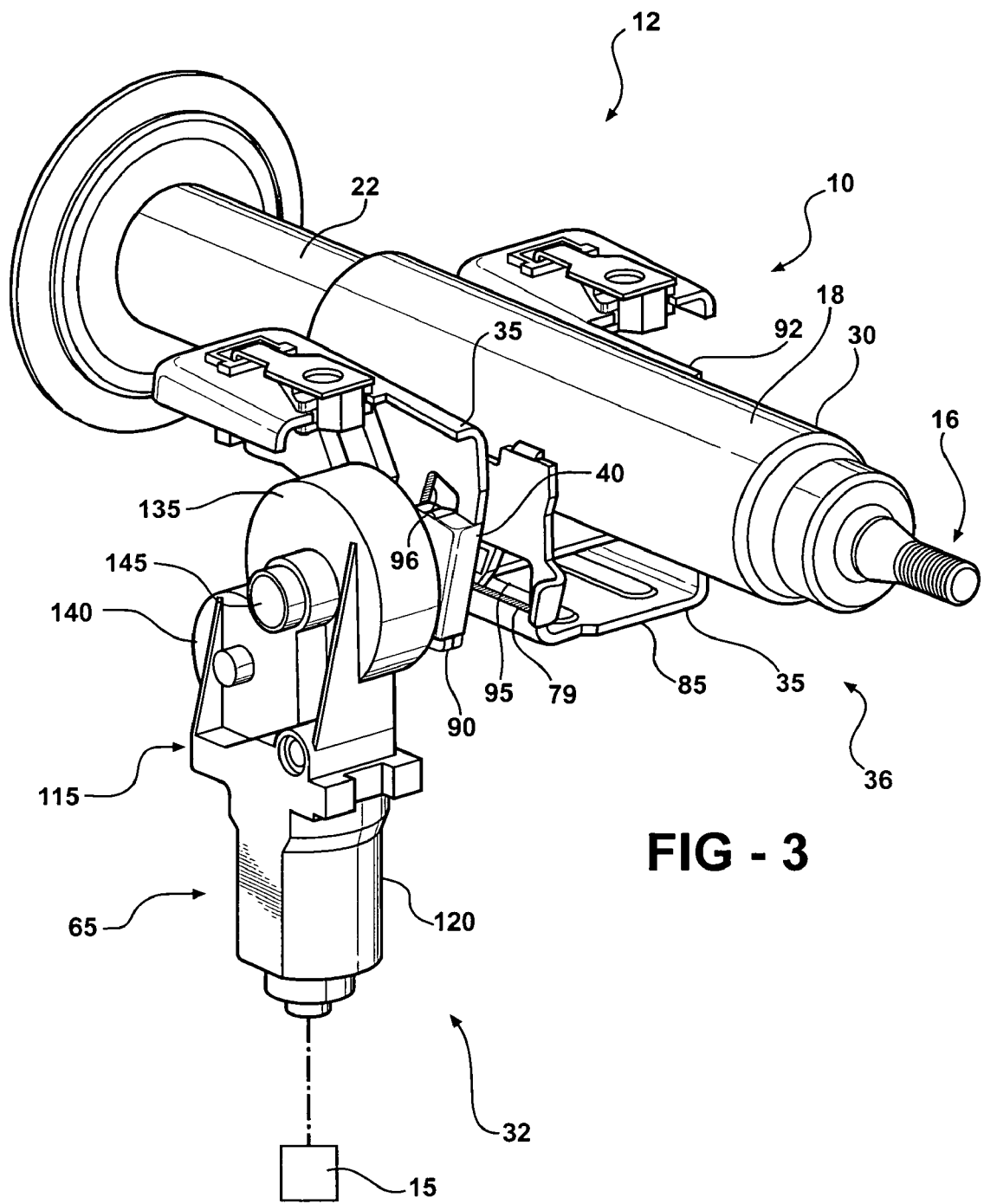
FIG. 3 is a perspective view of the first exemplary embodiment.

FIGS. 2 and 3 provide detailed views of the first exemplary embodiment of the invention. The steering column 10 includes a steering wheel supporting portion 16 for supporting a steering wheel in a vehicle. The steering column 10 also includes a first and second members 18, 22 that are moveable relative to one another. The first and second members 18, 22 are moveable relative to one another over a tilting path 26 of movement, or a telescoping path 28 of movement, or both. As used herein, tilting movement contemplates both full column tilting movement and raking movement associated with a tilt housing. The driver moves the first and second members 18, 22 relative to one another to adjustably position the steering wheel supporting portion 16 and, as a result, the steering wheel. The first member 18 is shown as upper and outer steering column jacket and the second member 22 is shown as a lower or inner steering column jacket. In alternative embodiments of the invention, the first member 18 could be inner steering column jacket. Also, the steering column 10 could include a tilt housing engaged with a pair telescoping members. Also, the first and second members 18, 22 could be defined as brackets.

The first member 18 of the steering column 10 has a housing 30 and at least one movement bracket 35 attached to the housing 30. The bracket 35 is movably associated with a second bracket 37 attached to the vehicle. For example, the bracket 35 can move transversely relative to the second bracket 37 to support the steering column 10 during movement along the tilting path 26. Also, the bracket 35 can move longitudinally relative to the second bracket 37 to support the steering column 10 during movement along the telescoping path 26. The brackets 35, 37 define slots 95, 97 on opposite sides 100, 101, respectively, of the housing 30 and a first shaft 34, such as a rake bolt 50, extends through the slots 95, 97 on both sides 100, 101 to limit the range of movement between the brackets 35, 37 over both the tilting path 26 and the telescoping path 28.

The control structure 20 referred to above includes appropriate structure for preventing movement between the first and second members 18, 22. The control structure 20 includes a locking device 32 selectively engageable with the first and second members 18, 22 to lock the first and second members 18, 22 with respect to one another and substantially prevent movement along the tilting path 26 and the telescoping path 28. The steering column 10 and the locking device 32 define an apparatus 12. The locking device 32 includes an electric motor 120 and locking portion driven between locked and unlocked positions by movement of the electric motor 120. For example, the locking device 32 of the first exemplary embodiment includes a squeeze-lock 36. The first and second members 18, 22 are locked and unlocked with respect to one another in response to activation of the electric motor 120. For example, when the electric motor 120 is activated in a first mode of operation, the squeeze-lock 36 compresses the brackets 35, 37 with respect to one another and locks the first and second members 18, 22 relative to one another. When the electric motor 120 is activated in a second mode of operation, the squeeze-lock 36 reduces the compressive forces acting on the brackets 35, 37 and unlocks the first and second members 18, 22 relative to one another. The first mode of operation of the electric motor 120 corresponds to a shaft (not shown) of the electric motor 120 rotating in a first direction and the second mode of operation corresponds to the shaft rotating in a second direction, wherein the first and second directions are opposite with respect to one another. As set forth below, the electric motor 120 cooperates with the rake bolt 50 to move the squeeze-lock 36 between the locked and unlocked positions. In the first exemplary embodiment, the electric motor 120 is directly engaged with the first shaft 34a.

The squeeze-lock 36 includes a support plate 40 engaged with a cam 45. The cam 45 of the support plate 40 may be formed integrally with the support plate 40 or be a piece that is connected with the support plate 40. For example, a bore 105 may be formed within the support plate 40 in which the cam 45 is press fit. The manner of forming the cam 45 in the support plate 40 is not critical and alternative means of forming cams within the support plate 40 can be utilized without departing from the inventive aspect of the mechanism.

The support plate 40 also preferably includes a cam guide 110 attached therewith. The cam guide 110 aligns a cam insert 80 with the cam 45 formed in the support plate 40. The cam insert 80 disposed about the rake bolt 50 to facilitate increasing or decreasing a compression force to allow for movement of the housing 30 relative to a driver. As can be seen in FIG. 2, the cam guide 110 has a shape corresponding to the cam insert 80 to prevent misalignment of the cam insert 80 with the cam 45.

The rake bolt 50 has first 55 and second 60 ends. An electric actuator 65 is attached to the rake bolt 50 at the first end 55 and allows for moving the rake bolt 50. Movement of the rake bolt 50 allows a switching action whereby movement of the housing 30 relative to a driver is initiated and halted. The electric actuator 65 is described in greater detail below.

The at least one movement bracket 35 of the first embodiment preferably comprises a mounting bracket 85 and a rake bracket 90 both of which are attached to the housing 30. The mounting bracket 85 is generally a U-shaped member attached at an underside of the housing 30. The mounting bracket 85 has slots 95 formed on opposite sides 100. The slots 95 allow the rake bolt 50 to pass through. The first embodiment also includes a second rake bracket 92 attached to the housing 30 on an opposite side 94 of the housing 30 relative to a first rake bracket 90 thereby creating a symmetrical orientation. In this manner, the housing 30 can maintain a uniform collapse stroke during a crash.

The electric actuator 65 includes an electric motor assembly 115. The electric motor assembly 115 includes the electric motor 120, gearing 125 for transferring the rotary motion of the electric motor 120, and a mounting rod 130 for attaching the electric motor assembly 115 to the support plate 40. The gearing 125 associated with the electric motor assembly 115 comprises a partial gear 135 that is meshed with a gear 140 that is connected to the electric motor 120. The first end 55 of the rake bolt 50 is connected to the partial gear 135 for providing movement to the rake bolt 50. A limiting switch 145 is associated with the partial gear 135 to stop rotation of the partial gear 135 corresponding to initiating and halting movement of the steering column housing 30 relative to a driver.

The electric actuator 65 need not be directly attached to the rake bolt 50, as described above. The actuator 65 can be placed at other positions on the steering column housing 30 and the rotary motion transmitted to the rake bolt 50 and the cam insert 80 through a belt and pulley drive, a chain and sprocket drive or a screw rod and crank without departing from the inventive aspect of the mechanism. Also, the cam 45 and cam insert 80 may be replaced by a multiple lead screw rod that may be turned by the electric actuator 65 to clamp the mounting bracket 85 and increase or decrease the compression force as described above.

In a preferred aspect of the present invention, the rake bolt 50 includes a locking portion 150 circumferentially disposed thereon for interacting with the mounting 85 and rake brackets 90, 92. In a preferred embodiment, two locking portions 150 are disposed about the rake bolt 50 to interact with the symmetrically positioned mounting bracket 85 and rake brackets 90 and 92, as previously described. As stated above, the mounting bracket 85 includes slots 95 formed on opposite sides 100 of the mounting bracket, to allow for passage of the rake bolt 50. The slots 95, in a preferred aspect, include serrations 79 formed along a bottom edge of the slot such that they engage with teeth 78 formed on the locking portion 150. The rake brackets 90, 92 also include serrations 96 formed on an edge of the slot, again to mesh with the teeth 78 formed on the locking portion 150 during a collision. The teeth 78 formed on the locking portion 150 and the serrations 79, 96 formed on the mounting 85 and rake brackets 90, 92 provide a positive locking feature designed to move the steering column housing 30 in a uniform manner along a collapse stroke, during a collision. The first end 55 of the rake bolt 50 may include a shaped portion 155 that mates with the electric motor assembly 115. The shaped portion 155 can be square, keyed, any other shape that is designed to mesh with the partial gear 135 of the electric motor assembly 115.

The first embodiment includes a spring 165 associated with the support plate 40 that allows for movement of the electric motor assembly 115 corresponding to movement of the housing 30. In this manner, the electric motor assembly 115 is allowed to move relative to the housing 30 while maintaining a connection with the rake bolt 50. The spring 165 is attached at a first end with the support plate 40 and at a second end to the electric motor assembly 115.

In another aspect of the first embodiment of the present invention, a positioning spring may be disposed between the mounting bracket 85 and the housing 30 for applying a constant biasing force that returns the housing 30 to an initial position when a force is not applied by the driver to move the housing 30. In this manner, when the steering column 10 is initiated to allow movement of the housing 30, the default position of fully telescoped in the most upward rake position will allow a driver to exit a vehicle without having to apply a force to the housing 30.

As described above with reference to the electrically actuated steering column system 5, a door switch, as opposed to the switch 15, may be included in a driver door such that when a vehicle is shutoff and the driver opens a door to exit, the steering column 10 is initiated to allow movement of the steering column housing 30. The positioning spring then applies a force to the rake bracket returning the housing 30 to an initial position, as detailed above.

In use, as the switch 15 of the electrically actuated steering column system 5 is depressed by a driver, the steering column 10 is allowed to move relative to the driver. The control structure 20 regulates the steering column 10 to permit and prevent movement of the housing 30.

Figure 5:
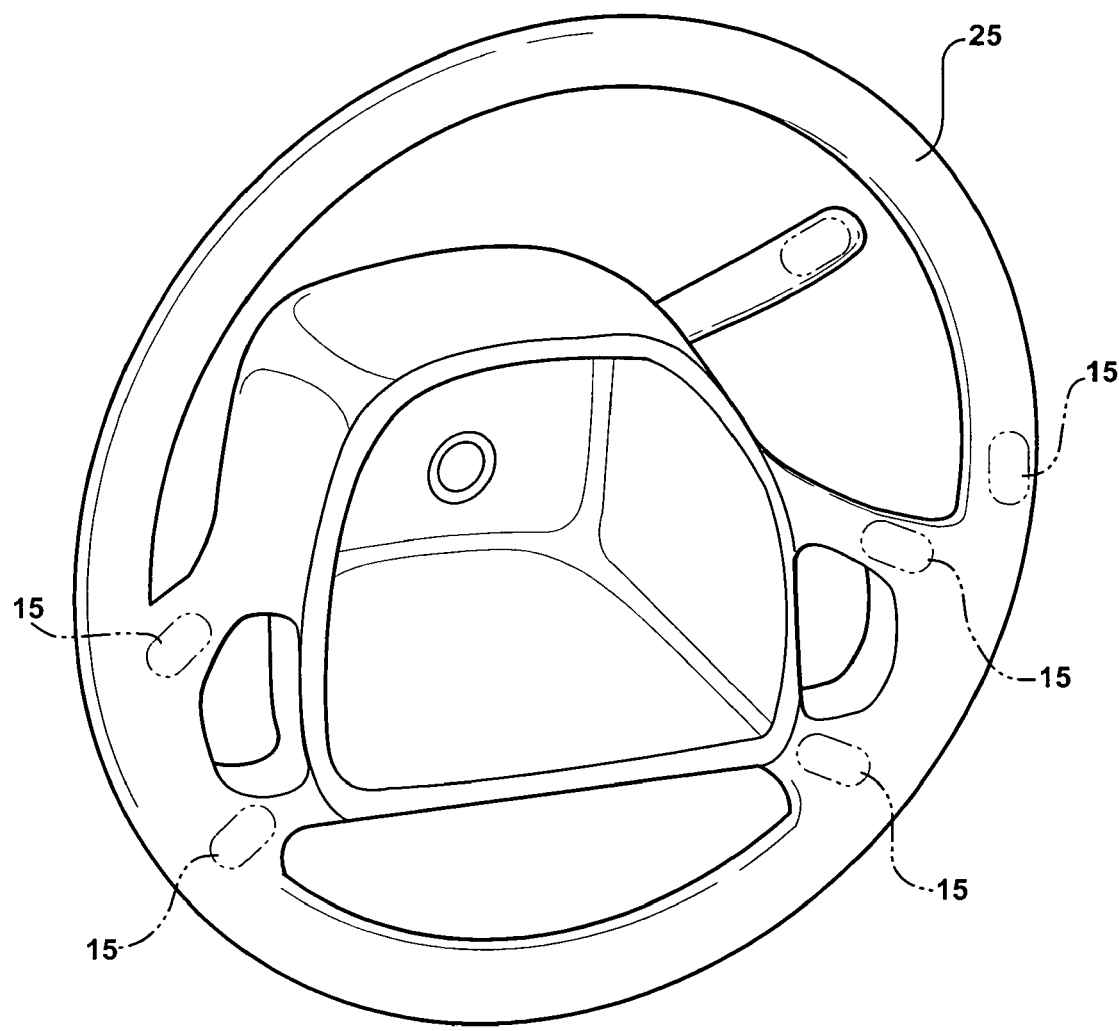
FIG. 5 is a perspective view of a steering wheel showing a plurality of possible positions for locating a switch.

Specifically, when the switch 15 is depressed by a diver, the electric motor 120 of the electric motor assembly 115 turns a gear 140 that is meshed with a partial gear 135. As best shown in FIG. 5, the switch 15 can be disposed on the steering wheel. The first end 55 of the rake bolt 50 is connected with the partial gear 135 such that the rake bolt 50 is turned in a rotary manner. The cam insert 80 disposed about the rake bolt 50 engages the cam 45 of the support plate 40 such that the compression force placed on the steering column 10 is decreased to allow movement of the steering column housing 30 relative to the driver. In other words, depressing the switch 15 activates the electric motor 120 in the second mode of operation to move the components that cooperate to frictionally lock the steering column 10 against adjustment to the unlocked position by releasing the frictional bonding force applied to the steering column 10. The control structure 20 deactivates the electric motor 120 once rotation of the rake bolt 50 has sufficiently reduced the compression force to allow movement of the steering column housing 30. When the switch 15 is released by the driver, the control structure 20 initiates the electric motor 120 in the first mode of operation to turn the rake bolt 50 in an opposite direction to again apply a compression force to the electrically actuated steering column mechanism 10 such that movement of the steering column housing 30 relative to a driver is prevented. In other words, releasing the switch 15 moves the frictional locking device back to the locked position to prevent adjustment of the column mechanism 10. In this manner, a driver can simply depress a switch 15 to unlock the column for adjustment and release the switch 15 to restore the column 10 to a locked condition, thereby allowing slideable movement of the steering column housing 30 without the use of a lever as is commonly utilized in the art.

Figure 4:
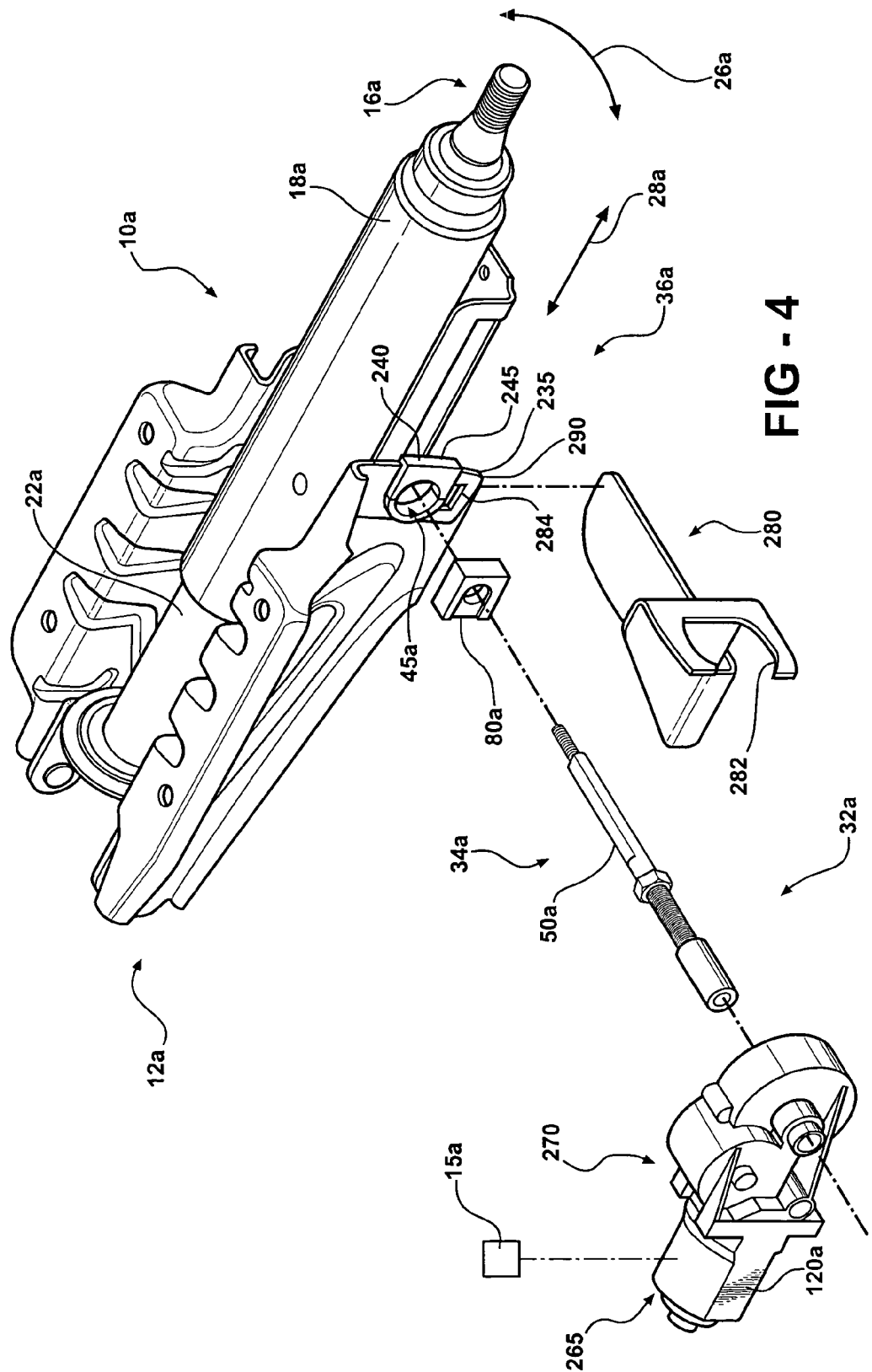
FIG. 4 is an exploded view of a second exemplary embodiment of the invention.

FIG. 4 shows a second embodiment of the steering column 10a of the invention. The steering column 10a includes first and second members 18a and 22a, as well as a steering wheel supporting portion 16a. The steering column 10a is adjustable only in a tilting manner along a tilting path 26a of movement and does not move along a telescoping path 28a of movement. The second embodiment also includes a locking device 32a cooperates with the steering column 10a to define an apparatus 12a. Therefore, the at least one movement bracket 235 comprises a rake bracket 290 only. The support plate 240 of the second embodiment is attached to the rake bracket 290 and includes a cam 45a just as with the previously described first embodiment. Again, a cam insert 80a is disposed over a first shaft 34a, such as a rake bolt 50a, to interact with the cam 45a to increase and decrease a compressive force, as previously described with reference to the first embodiment. With reference to FIG. 4, it can be seen that the support plate 240 of the second embodiment includes a flange 245 that engages the rake bracket 290 such that the support plate 240 can move relative to the rake bracket 290. The second embodiment also includes an electric actuator 265 that comprises an electric motor assembly 270 that includes an electric motor 120a activated for movement by a switch 15a. The electric motor 120a extends parallel to the steering column 10a. The electric motor assembly 270 is similar in respect to that of the previously described first embodiment with the exception that the electric motor assembly 270 does not include a mounting rod, as the support plate 240 is attached to the rake bracket 290. The electric motor assembly 270 of the second embodiment otherwise operates in a similar fashion to that of the first embodiment previously described. The electric motor assembly of the second embodiment, is however attached to the rake bracket 290 utilizing a motor mounting bracket 280. The motor mounting bracket 280 includes a C-shaped slot 282 that allows for the motor assembly to move while the motor mounting bracket 280 is permanently secured to a portion of the vehicle structure. In this manner, the motor assembly 270 is free-floating within the C-shaped slot to allow for movement of the rake bolt 50a within the slot 284 formed in the rake bracket 285.

Figure 6:
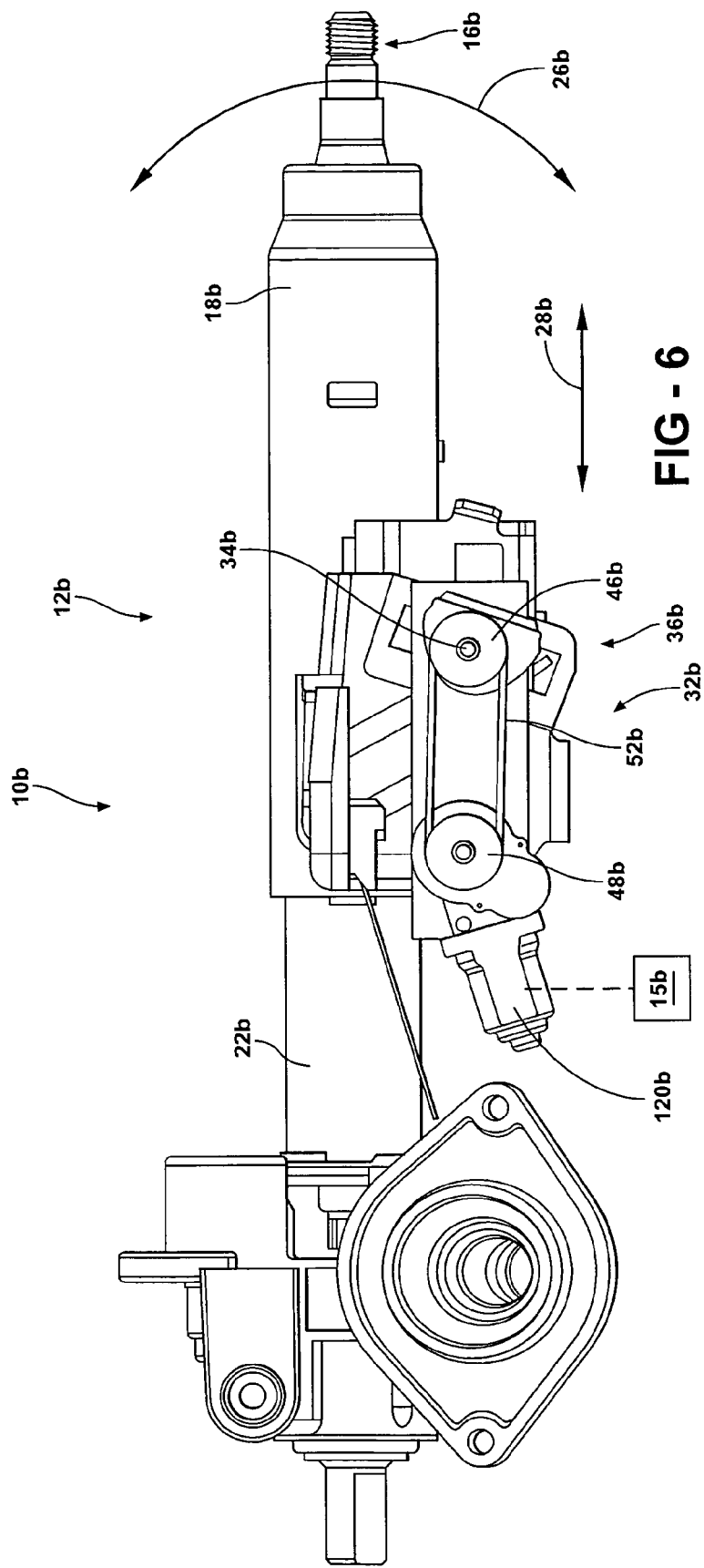
FIG. 6 is a side view of a third exemplary embodiment of the invention.

Referring now to FIG. 6, in a third exemplary embodiment of the invention, an apparatus 12b includes a steering column 10b and a locking device 32b. The steering column 10b includes a steering wheel supporting portion 16b for supporting a steering wheel. The steering column 10b also includes first and second members 18b, 22b that are moveable relative to one another to move the steering wheel supporting portion 16b. The first and second members 18b, 22b can support the steering wheel supporting portion 16b for movement along a tilting path 26b of movement, or a telescoping path 28b of movement, or both. The locking device 32b is selectively engageable with the first and second members 18b, 22b to lock the first and second members 18b, 22b with respect to one another and substantially prevent movement of the steering wheel supporting portion 16b. The locking device 32b includes an electric motor 120b and the first and second members 18b, 22b are locked or unlocked with respect to one another in response to activation of the electric motor 120b. The locking device 32b also includes a squeeze-lock 36b associated with a first shaft 34b and moved between locked and unlocked positions by the motor 120b. A switch 15b selectively activates the motor 120b.

The motor 120b moves at least a portion of the locking device 32b between first and second positions to lock and unlock, respectively, the first and second members 18*b*, 22*b* relative to one another. In the exemplary embodiment of the invention, the portion of the locking device 32*b* moved by the motor 120*b* is the first shaft 34*b*. However, in alternative embodiments of the invention, the portion could be a member defining teeth or a pin selectively insertable in an aperture or any other locking member. In the exemplary embodiment of the invention, the motor 120*b* moves the portion in rotation between first and second angular positions. However, in alternative embodiments of the invention, the movement of the portion could be translation or a combination of translation and rotation.

The electric motor 120*b* extends transverse to the steering column 10*b* and an intermediary member is operably disposed between the electric motor 120*b* and the first shaft 34*b*. The intermediary member includes a first pulley 46*b* engaged with the first shaft 34*b* and a second pulley 48*b* engaged with the electric motor 120*b*. A flexible drive member 52*b* is engaged with the first and second pulleys 46*b*, 48*b*. Rotation of the pulley 48*b* is communicated to the pulley 46*b* by the flexible drive member 52*b*. In alternative embodiments of the invention, the pulleys 46*b*, 48*b* can be replaced with sprockets and the flexible drive member 52*b* can be a chain.

Figure 7:
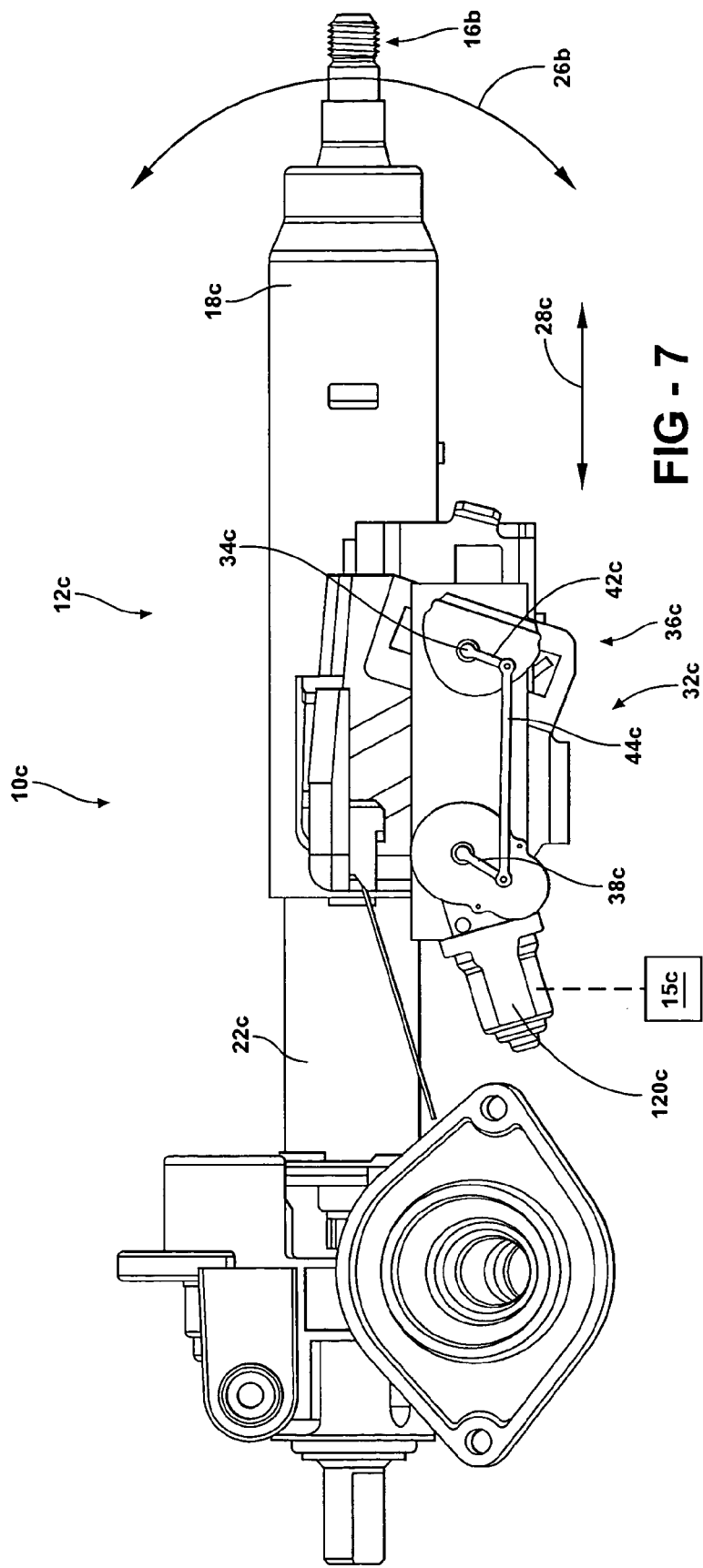
FIG. 7 is a side view of a fourth exemplary embodiment of the invention.

Referring now to FIG. 7, in a fourth exemplary embodiment of the invention, an apparatus 12*c* includes a steering column 10*c* and a locking device 32*c*. The steering column 10*c* includes a steering wheel supporting portion 16*c* for supporting a steering wheel. The steering column 10*c* also includes first and second members 18*c*, 22*c* that are moveable relative to one another to move the steering wheel supporting portion 16*c*. The first and second members 18*c*, 22*c* can support the steering wheel supporting portion 16*c* for movement along a tilting path 26*c* of movement, or a telescoping path 28*c* of movement, or both. The locking device 32*c* is selectively engageable with the first and second members 18*c*, 22*c* to lock the first and second members 18*c*, 22*c* with respect to one another and substantially prevent movement of the steering wheel supporting portion 16*c*. The locking device 32*c* includes an electric motor 120*c* and the first and second members 18*c*, 22*c* are locked or unlocked with respect to one another in response to activation of the electric motor 120*c*. The locking device 32*c* also includes a squeeze-lock 36*c* associated with a first shaft 34*c* and moved between locked and unlocked positions by the motor 120*c*. A switch 15*c* selectively activates the motor 120*c*.

The locking device 32*c* also includes an intermediary member such as a second shaft 38*c*. Activation of the electric motor 120*c* rotates the second shaft 38*c* and the first shaft 34*c* rotates in response to rotation of the second shaft 38*c*. The first and second shafts 34*c*, 38*c* are transverse with respect to one another. The second shaft 38*c* defines a longitudinal axis and is rotated about a rotational axis that extends transverse to the longitudinal axis. The intermediary member associated with the apparatus 12*c* also includes first and second linking members 42*c*, 44*c* operably disposed between the first and second shafts 34*c*, 38*c*. The linking member 44*c* rotates and translates in response to rotation of the second shaft 38*c*. The linking member 42*c* rotates in response to translation and rotation of the linking member 44*c*. The first shaft 34*c* rotates in response to rotation of the linking member 42*c*.

Figure 8:
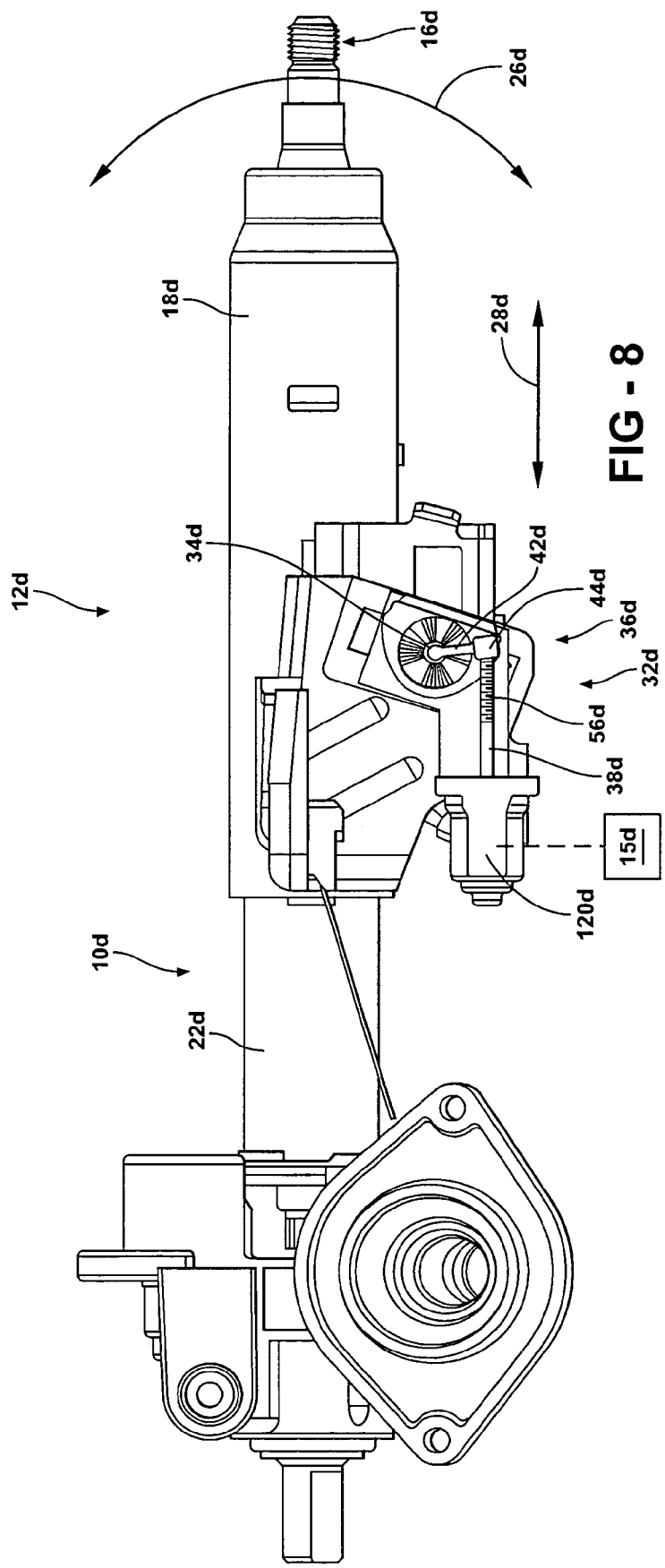
FIG. 8 is a side view of a fifth exemplary embodiment of the invention.

Referring now to FIG. 8, in a fifth exemplary embodiment of the invention, an apparatus 12*d* includes a steering column 10*d* and a locking device 32*d*. The steering column 10*d* includes a steering wheel supporting portion 16*d* for supporting a steering wheel. The steering column 10*d* also includes first and second members 18*d*, 22*d* that are moveable relative to one another to move the steering wheel supporting portion 16*d*. The first and second members 18*d*, 22*d* can support the steering wheel supporting portion 16*d* for movement along a tilting path 26*d* of movement, or a telescoping path 28*d* of movement, or both. The locking device 32*d* is selectively engageable with the first and second members 18*d*, 22*d* to lock the first and second members 18*d*, 22*d* with respect to one another and substantially prevent movement of the steering wheel supporting portion 16*d*. The locking device 32*d* includes an electric motor 120*d* and the first and second members 18*d*, 22*d* are locked or unlocked with respect to one another in response to activation of the electric motor 120*d*. The locking device 32*d* also includes a squeeze-lock 36*d* associated with a first shaft 34*d* and moved between locked and unlocked positions by the motor 120*d*. A switch 15*d* selectively activates the motor 120*d*.

The locking device 32*d* also includes an intermediary member such as a second shaft 38*d* that defines a worm gear 56*d*. The locking device 32*d* also includes linking members 42*d* and 44*d*. The linking member 44*d* is a nut associated with the worm gear 56*d*. For example, the linking member 44*d* translates in response to rotation of the second shaft 38*d*, the shaft 38*d* rotating about its longitudinal axis. The linking member 42*d* rotates in response to translation of the linking member 44*d*. The shaft 34*d* rotates in response to rotation of the linking member 42*d*.

Figure 9:
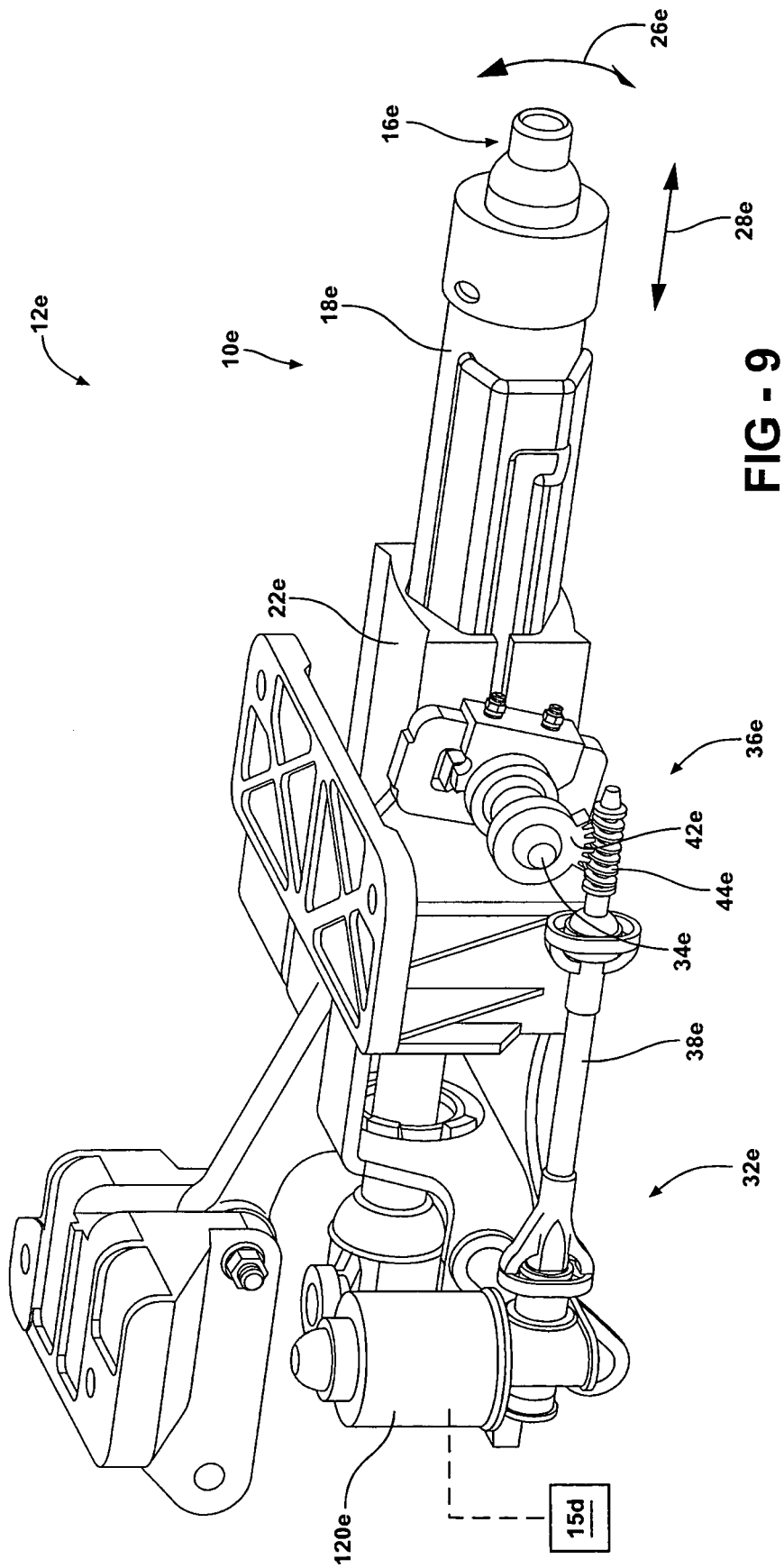
FIG. 9 is a side view of a sixth exemplary embodiment of the invention.
Figure 10:
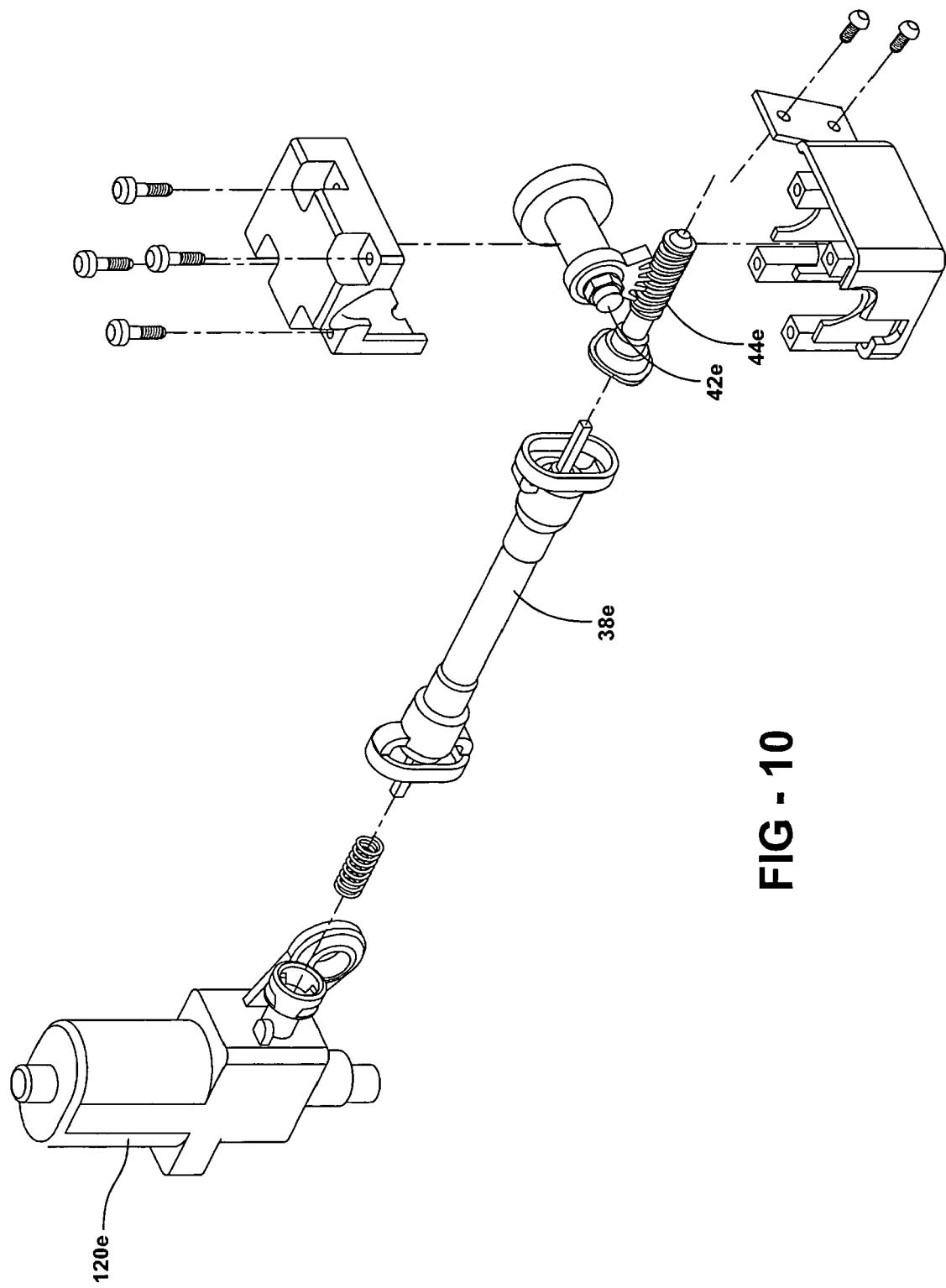
FIG. 10 is an exploded view of a portion of a locking device associated with the fifth exemplary embodiment.

Referring now to FIGS. 9 and 10, in a sixth exemplary embodiment of the invention, an apparatus 12*e* includes a steering column 10*e* and a locking device 32*e*. The steering column 10*e* includes a steering wheel supporting portion 16*e* for supporting a steering wheel. The steering column 10*e* also includes first and second members 18*e*, 22*e* that are moveable relative to one another to move the steering wheel supporting portion 16*e*. The first and second members 18*e*, 22*e* can support the steering wheel supporting portion 16*e* for movement along a tilting path 26*e* of movement, or a telescoping path 28*e* of movement, or both. The locking device 32*e* is selectively engageable with the first and second members 18*e*, 22*e* to lock the first and second members 18*e*, 22*e* with respect to one another and substantially prevent movement of the steering wheel supporting portion 16*e*. The locking device 32*e* includes an electric motor 120*e* and the first and second members 18*e*, 22*e* are locked or unlocked with respect to one another in response to activation of the electric motor 120*e*. The locking device 32*e* also includes a squeeze-lock 36*e* associated with a first shaft 34*e* and moved between locked and unlocked positions by the motor 120*e*. A switch 15*e* selectively activates the motor 120*e*.

The locking device 32*e* also includes an intermediary member including a second shaft 38*e* and linking members 44*e* and 42*e*. The shaft 38*e* rotates in response to rotation of the motor 120*e*. The linking member 44*e* is engaged with a second shaft 38*e* in a cam/cam-follower relationship. For example, the linking member 44*e* translates in response to rotation of the second shaft 38*e*. The linking member 42*e* rotates in response to translation of the linking member 44*e*. The first shaft 34*e* rotates in response to rotation of the linking member 42*e*.

Figure 11:
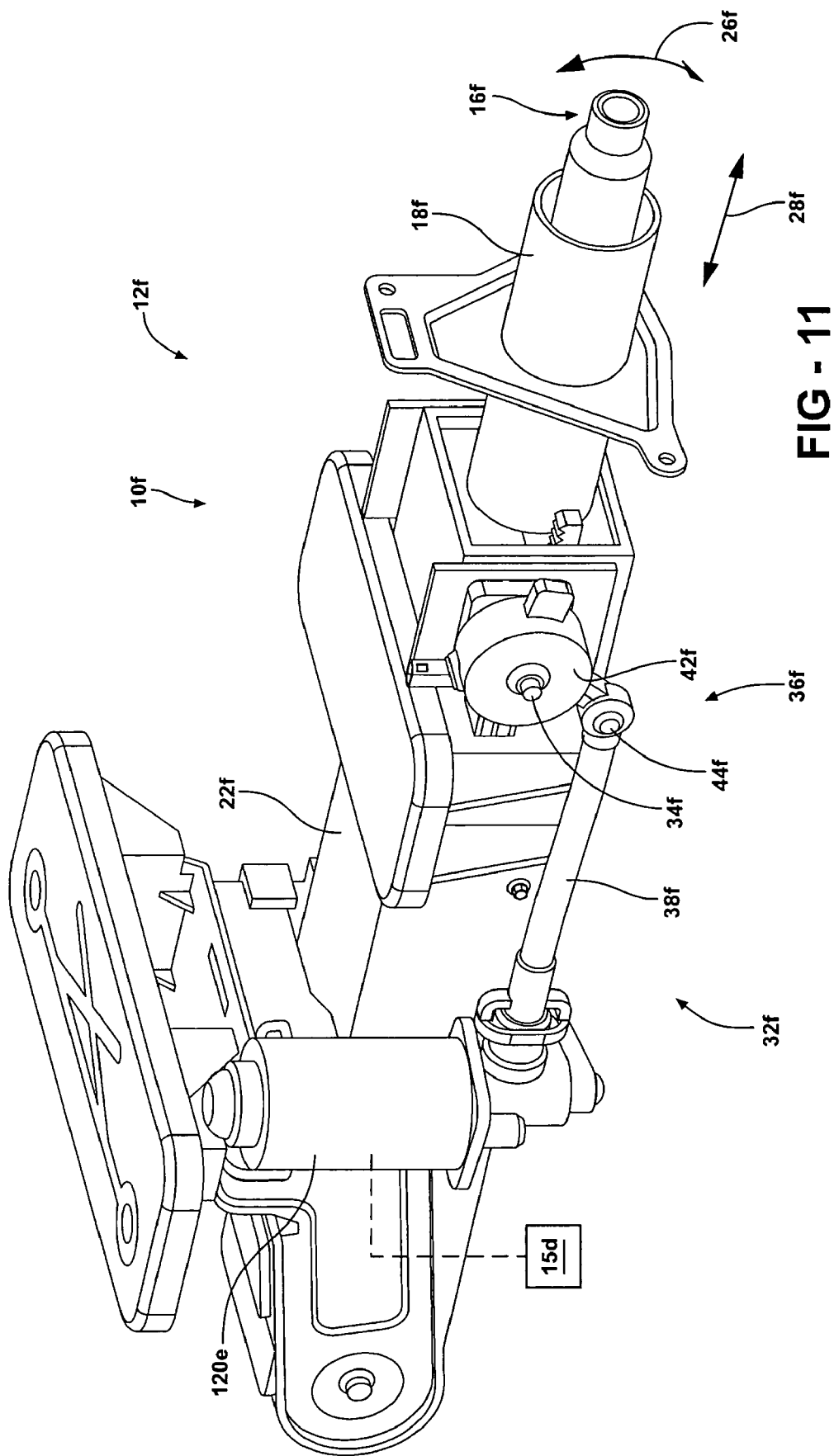
FIG. 11 is a side view of a seventh exemplary embodiment of the invention.

Referring now to FIG. 11, in a seventh exemplary embodiment of the invention, an apparatus 12*f* includes a steering column 10*f* and a locking device 32*f*. The steering column 10*f* includes a steering wheel supporting portion 16*f* for supporting a steering wheel. The steering column 10*f* also includes first and second members 18*f*, 22*f* that are moveable relative to one another to move the steering wheel supporting portion 16*f*. The first and second members 18*f*, 22*f* can support the steering wheel supporting portion 16*f* for movement along a tilting path 26*f* of movement, or a telescoping path 28*f* of movement, or both. The locking device 32*f* is selectively engageable with the first and second members 18*f*, 22*f* to lock the first and second members 18*f*, 22*f* with respect to one another and substantially prevent movement of the steering wheel supporting portion 16*f*. The locking device 32*f* includes an electric motor 120*f* and the first and second members 18*f*, 22*f* are locked or unlocked with respect to one another in response to activation of the electric motor 120*f*. The locking device 32*f* also includes a squeeze-lock 36*f* associated with a first shaft 34*f* and moved between locked and unlocked positions by the motor 120*f*. A switch 15*f* selectively activates the motor 120*f*.

The locking device 32*f* also includes an intermediary member including a second shaft 38*f* and linking members 42*f*, 44*f*. The linking member 44*f* is a gear and rotates in response to rotation of the second shaft 38*f*, the shaft 38*f* rotating about its longitudinal axis. The linking member 42*f* defines teeth engageable with teeth of the linking member 44*f* and rotates in response to rotation of the linking member 44*f*. The first shaft 34*f* rotates in response to rotation of the linking member 42*f*.

Figure 12:
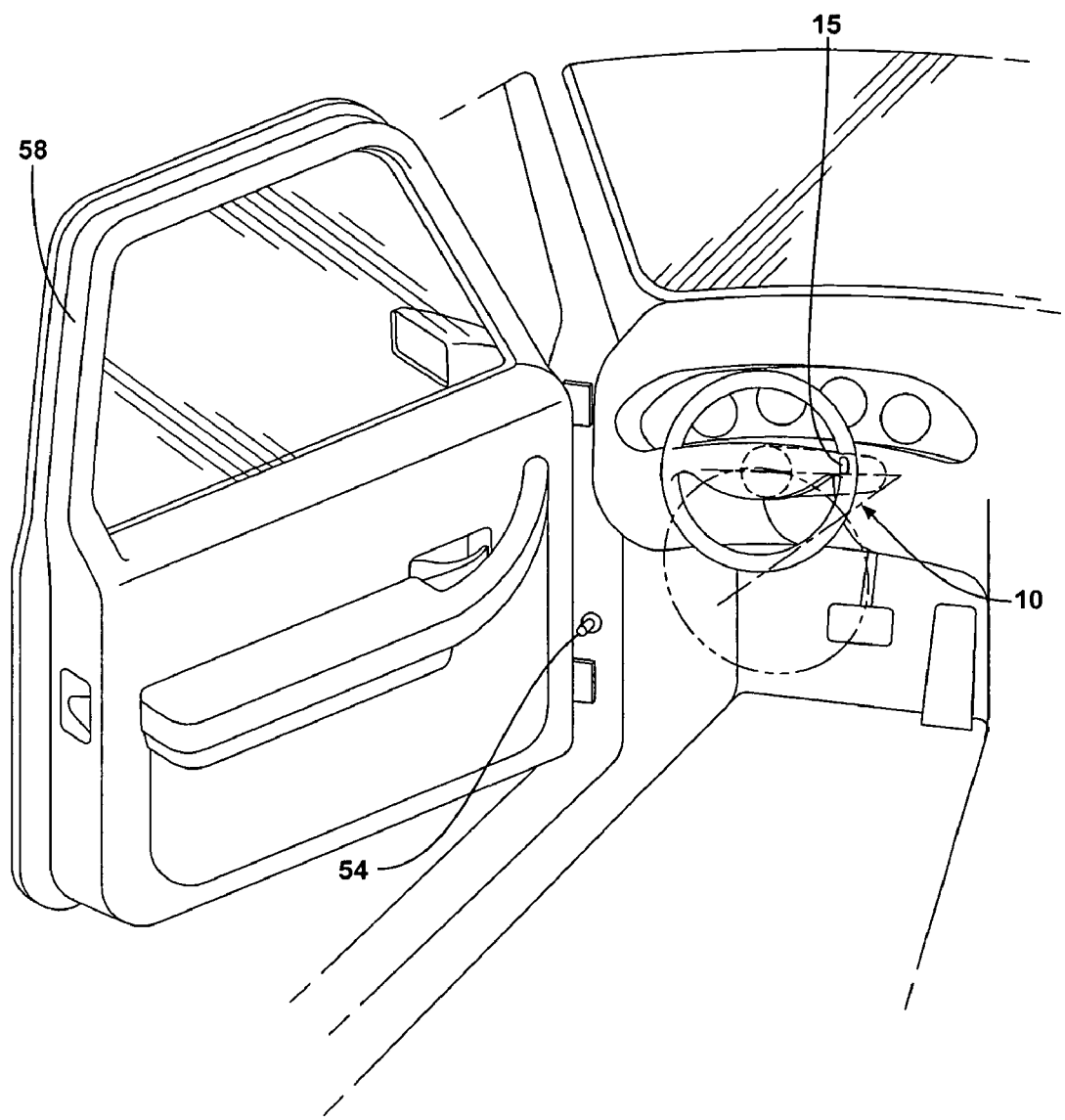
FIG. 12 is a perspective view of an eighth exemplary embodiment of the invention.

Referring now to FIG. 12, the invention includes a second switch 54 that is spaced from the steering column 10 and also spaced from the first switch 15. The second switch 54 communicates with the electric motor 120 to selectively activate the electric motor 120 and to move the locking device, such as any of locking devices 32-32*f*, between the locked and unlocked positions. In operation, when the driver of the vehicle opens the door 58, the switch 54 is engaged and the locking device is moved to the unlocked position. The steering column 10 can then be tilted upwardly and telescopically retracted to make exiting the vehicle easier. Similarly, entering the vehicle under these conditions is also easier.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for positioning a steering wheel of a vehicle in a desired position comprising:
   a steering column including a steering wheel supporting portion for supporting a steering wheel and also including first and second members movable relative to one another to move said steering wheel supporting portion along at least one of a tilting path of movement and a telescoping path of movement;
   a locking device selectively engageable with said first and second members to lock said first and second members with respect to one another and substantially prevent movement along said at least one of said tilting path and said telescoping path, said locking device including an electric motor and a moveable portion wherein said electric motor moves said moveable portion between first and second positions such that said first and second members being locked with respect to one another when said moveable portion is in said first position and being unlocked with respect to one another when said moveable portion is in said second position;
   said locking device includes a first shaft wherein said activation of said electric motor rotates said first shaft; and
   said locking device includes a squeeze-lock engaged with said first shaft wherein said squeeze-lock compresses said steering column in response to rotation of said first shaft in a first direction.

2. The apparatus of claim 1 wherein said electric motor extends parallel to said steering column.

3. The apparatus of claim 1 including a second shaft wherein said activation of said electric motor rotates said second shaft and said first shaft rotates in response to rotation of said second shaft.

4. The apparatus of claim 3 wherein said first and second shafts are transverse with respect to one another.

5. The apparatus of claim 4 wherein said second shaft includes a longitudinal axis and wherein said second shaft rotates about a rotational axis extending transverse with respect to said longitudinal axis.

6. The apparatus of claim 5 including first and second linking members operably disposed between said first and second shafts.

7. The apparatus of claim 4 wherein said second shaft includes a longitudinal axis and wherein said second shaft rotates about said longitudinal axis.

8. The apparatus of claim 4 wherein said second shaft defines a worm gear.

9. The apparatus of claim 1 wherein said locking device includes a first pulley engaged with said first shaft and a second pulley engaged with said electric motor and a flexible drive member engaged with said first and second pulleys.

10. An apparatus for positioning a steering wheel of a vehicle in a desired position comprising:
    a steering column including a steering wheel supporting portion for supporting a steering wheel and also including first and second members movable relative to one another to move said steering wheel supporting portion along at least one of tilting path of movement or a telescoping path of movement;
    a locking device selectively engageable with said first and second members to lock said first and second members with respect to one another and substantially prevent movement along said at least one of said tilting path or said telescoping path, said locking device including an electric motor wherein said first and second members being locked and unlocked with respect to one another in response to activation of said electric motor, said locking device also including a first shaft engaged for rotation with said electric motor such that said electric motor, in a first mode of operation, rotates said first shaft in a first direction to lock said steering column and, in a second mode of operation, rotates said first shaft in a second direction to unlock said steering column; and
    a first switch for controlling said activation of said electric motor wherein said switch is spaced from said steering column for being engaged by a driver of the vehicle during normal vehicle handling and also including a second switch for controlling said activation of said electric motor wherein said second switch is spaced from said steering column and spaced from said first switch for engaging said electric motor when the driver enters or exits the vehicle.

11. The apparatus of claim 10 including a squeeze-lock engaged with said first shaft wherein said squeeze-lock compresses said steering column in response to rotation of said first shaft in said first direction and releases said steering column in response to rotation of said first shaft in said second direction.

12. The apparatus of claim 10 wherein said electric motor is directly engaged with said first shaft.

13. The apparatus of claim 10 including an intermediary member operably disposed between said electric motor and said first shaft.

14. The apparatus of claim 13 wherein said intermediary member is a second shaft.

* * * * *